United States Patent

[11] 3,554,160

[72] Inventors Ronald Fortune
 Hamilton, Ontario;
 Ernest G. Mills; James Beverley Woods,
 Kitchener, Ontario, Canada
[21] Appl. No. 812,255
[22] Filed Apr. 1, 1969
[45] Patented Jan. 12, 1971
[73] Assignee Canada Valve Limited
 Kitchener, Ontario, Canada
 a body corporate of Canada

[54] INDICATOR POSTS FOR USE IN CONJUNCTION WITH VALVES
14 Claims, 4 Drawing Figs.
[52] U.S. Cl. .................................................. 116/125,
 74/89.15
[51] Int. Cl. .................................................. F16k 37/00
[50] Field of Search ........................................... 116/125,
 133; 137/553, 556; 251/(Inquired); 74/89.14,
 89.15, 99

[56] References Cited
UNITED STATES PATENTS
| | | | |
|---|---|---|---|
| 684,191 | 10/1901 | Chatham | 137/553X |
| 951,927 | 3/1910 | Whitney | 116/125 |
| 1,386,065 | 8/1921 | Lofton | 116/125 |
| 1,806,305 | 5/1931 | Mueller | 137/553 |
| 2,140,934 | 12/1938 | Dopp | 116/125 |
| 3,134,570 | 5/1964 | Jarrett | 137/556X |
| 3,150,534 | 9/1964 | Harrison | 74/89.15X |

Primary Examiner—Louis J. Capozi
Attorney—Edward H. Lang

ABSTRACT: An indicator device for a nonrising stem valve has a housing in which is mounted an elongated screw adapted to be coupled to the valve stem. The screw is rotatable but cannot move axially. The screw is hollow and has a pair of elongated slots through which a bar extends transversely and an indicator rod, located in the hollow screw, is attached to the bar. The ends of the bar are attached to a follower threaded onto the screw. The follower nut can move axially of the screw but is restrained against rotation. The bar ends are connected to the nut in a manner to allow the bar to rotate with the screw. As the screw is turned the nut, bar and rod move axially of the screw.

INDICATOR POSTS FOR USE IN CONJUNCTION WITH VALVES

This invention relates to indicator posts for use in combination with valves for control of the flow of fluid. More particularly it relates to indicator posts for valves used in civic water distribution systems wherein the valve proper is buried below ground level and the indicator post is detachably mounted on the valve and extends upwardly through the ground. At the highest level or top of the indicator post, above ground level, it is normal practice to have some mode of mechanism incorporated therein to provide movable components to visually indicate whether the buried valve is open or closed, particularly when viewed from a substantial distance.

The present specification provides for a simple and efficient yet practicable mechanism which is wholly contained within a totally closed housing, the outer wall diameter of which has a smooth and continuous surface whereby to adequately protect the completely enclosed mechanism against widely varying climatic elements and physical damage and, in addition, to provide improved reliability when subject to arduous service conditions. Moreover, the present invention eliminates sight windows of glass which are subject to physical damage and other disadvantages caused by the aforementioned climatic conditions which impair visual observation particularly when reversals in atmospheric temperature and humidity precipitate fog on the glass panes of the windows in the indicator post.

In the prior art the housing of the indicator post, normally referred to as the barrel, is constructed at its upper or outermost extremity to accommodate two window frames which are spaced 180° apart. These window frames are cast integral with the barrel to receive the glass panes which, to exclude rain, sleet and snow, must be gasketed and securely fastened into the inside of the barrel. It should be apparent that such a construction has inherent disadvantages as, for example, uneconomic construction, vulnerability to extreme climatic variations, impaired visual function and, not least, less reliability in actual service.

It is therefore one object of my invention to provide an indicator post totally encasing a novel indicator actuating mechanism at its outermost extremity whereby to isolate the mechanism from changing climatic elements which would otherwise expose it to damage.

Another object of the invention is to provide an indicator post comprising a mechanism capable of converting rotational action to translational motion so as to impart inward or downward and outward or upward reciprocal movement to an indicator rod and to provide positive visual observance of the open and closed positions of the valve on which the indicator post is mounted.

A further object of the invention is to provide an indicator post having a unique construction which permits tolerances between the movable components such that components can be easily replaced or interchanged, greater economy in manufacturing production, and improved reliability in service.

Other objects and advantages will become apparent from a study of the following detailed specification taken in conjunction with the accompanying drawings.

Figure 2:
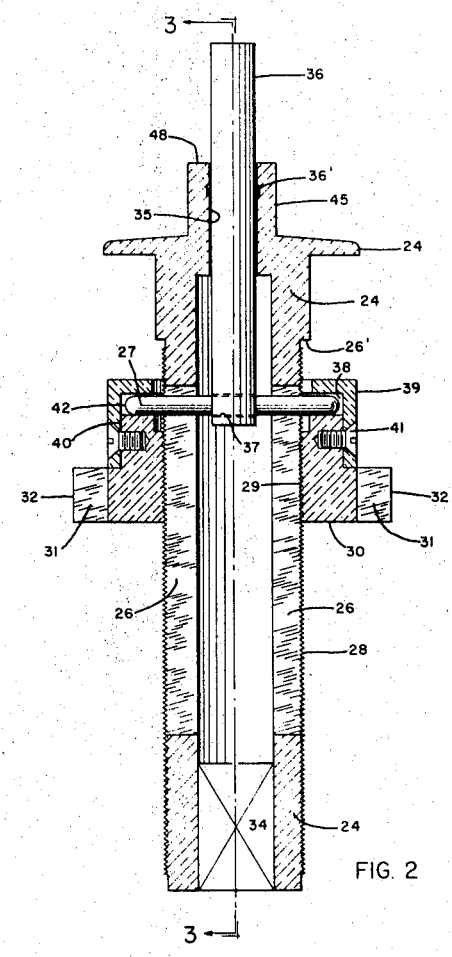
FIG. 2 is a vertical, fragmentary cross-sectional view of the post operating mechanism in larger scale with the indicator rod in the fully projected position.
Figure 3:
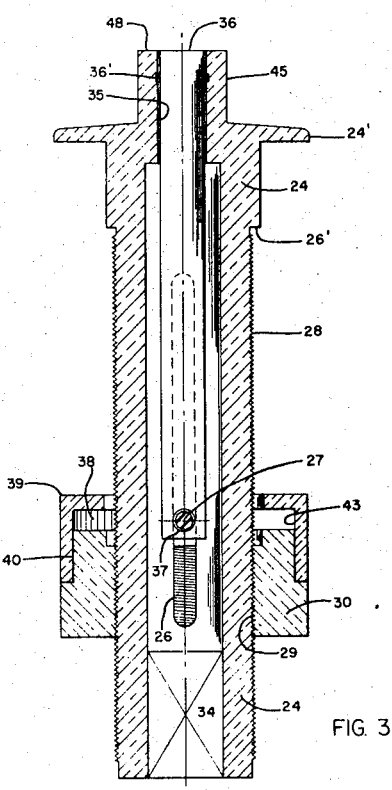
Figure 4:
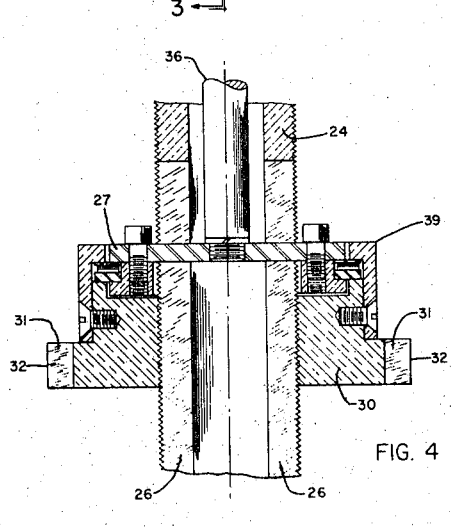

FIG. 3 is a longitudinal, cross-sectional view taken on the line 3–3 of FIG. 2 with the indicator rod in fully retracted position illustrating the transverse slots in the operating screw which receive therein and therethrough the crossbar to which the indicator rod is loosely attached; and FIG. 4 is a fragmentary, longitudinal section showing a modified construction incorporating an antifriction bearing and crossbar for application where needed in very large valves or sluice gates.

Figure 1:
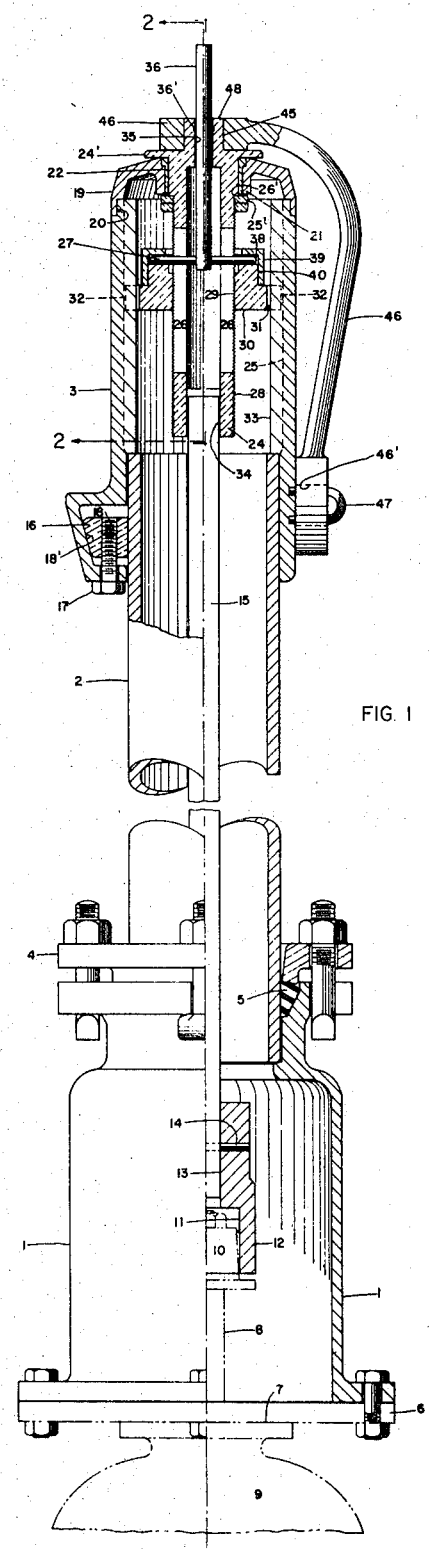
FIG. 1 is a vertical, part-sectional view of the novel indicator post and housing therefor.

Referring to FIG. 1, the indicator post A comprises a base 1, an extension pipe 2, a mechanism housing or body 3, a gland ring 4 and packing gasket 5. A mounting plate 6 is attached to the bonnet flange of the valve bonnet 7 thus supporting the indicator post assembly.

The stem 8 (shown in broken line) of the valve 9 has a hexagonal or other shaped adapter nut 10 mounted on the upper end and rotates as a unit with the stem. Nut 10 is receivable in a matching configurated core 11 of the coupling 12. The upper portion of coupling 12 has a square shaped core 13 and is attached, as by the pin 14, to extension rod 15 the lower end of which is square shaped in order to couple with the coupling 12. Housing 3 preferably telescopes the outer wall of extension pipe 2 and is fastened thereto by means of the wedging and clamping action of the locking wedge 16 as the cap screw 17 is rotated into engagement with the threaded hole 18 causing tension which draws the wedge 16 into locking position where it abuts against the outer wall of the extension pipe 2 and the inner wall of wedge pocket 18' formed at the lower end of housing 3.

Bonnet 19 is fastened to the upper end of housing 3 by any known conventional means as, for example, cap screws. The bonnet 19 is formed with a sleeve 21 extending centrally inwardly of the bonnet.

Mounted in bushing 22 is operating screw 24, depending into the bore 25 of the housing 3 to an extent sufficient to accommodate the greatest distance of travel required for the largest size of valve, with which the indicator post is designed to cooperate. Screw 24 is formed with flange 24' which bears against the top of bonnet 19. Lock nut 25' is threaded onto screw 24 against shoulder 26' and prevents the operating screw 24 from moving longitudinally. The operating screw 24 is provided with two diametrically elongated opposed slots 26 through which the crossbar 27 passes transversely to the central axis of the operating screw 24. The latter is externally threaded as at 28 and is receivable within the internally threaded hole 29 of the follower nut 30. The latter has two diametrically opposed female slots or keyways 31 formed integrally with nut 30, the outermost radius 32 of which keyways loosely straddle male guide ribs 33 formed integrally with and extending inwardly from the wall of housing 3. The keyways and guides restrain the follower nut 30 from rotation yet guide it in direct translational motion.

At its lower or inner end the operating screw 24 has a cored hole 34 of square configuration to receive loosely therein the square-shaped outer or upper end of the extension stem 15 whereby to form, between them, a male and female coupling to rotatably impart motion from the operating screw 24 to the extension rod 15. The upper portion 35 of operating screw 24 is bored to snugly and slidably receive therein the indicator rod 36 sealed by O-ring 36'. The rod has at its lower extremity a circular transverse hole 37 therein to loosely accommodate the round crossbar 27 which extends transversely through the slots 26 of the operating screw 24 with the ends of the bar connected with follower nut 30. Each end of the crossbar 27 projects into an annular recess 38 formed by the retaining cap 39 in conjunction with the follower nut 30 as it fits snugly over the diameter 40 to provide the annular bearing recess 38 in which the ends of bar 27 can revolve and rotate. The retaining cap 39 is securely fastened as, for example, by the screws 41 (FIG. 2). Preferably, the crossbar is arcuate shaped at both ends 42 to prevent binding against the inner wall 43 of the retaining cap as the crossbar 27 moves transversely.

Referring to FIG. 2, the operating screw 24 has formed integrally at its outer extremity a mounting flange 24' to facilitate assembly with the bonnet. Projecting outwardly therefrom and integral with the operating screw 24 is a nut-shaped portion 45 to fit the female from 46' of wrench 46 (FIG. 1) which normally is formed for permanent attachment to the indicator post by any conventional means, such as the hasp 47 and a padlock, not shown.

In operation, the wrench 46 is unlatched from its normally residual position and is applied to fit the nut 45 of the operating screw 24. Dependent on whether the valve 9 requires a clockwise or counterclockwise rotation to open it, will determine whether the direction of rotation of the operating screw 24 shall be either clockwise or counterclockwise. Consequently, the thread 28 on the external wall of the operating screw 24 and the mating internal thread 29 of the follower nut 30 may be threaded to effect either right-hand or left-hand lead.

In describing the operation it is assumed that the stem 8 of the valve proper is nonrising and that the assembled mechanism is required to raise the indicator rod 36 gradually and vertically beyond the top 48 of screw 24 so that when the valve is moved to the closed position, the indicator rod 36 projects beyond so as to be clearly visible.

As rotational motion is applied in a clockwise direction to the operating screw 24, the follower nut 30 whose internal thread 29 engages the external thread 28 of the operating screw 24 moves with translational motion upwardly from the lowermost position shown in FIG. 3 to the maximum extent shown in FIGS. 1 and 2. However, as both of the opposed keyways 31 straddle the guide ribs 33, the follower nut 30 is restrained from rotation while it travels upwardly and downwardly along the axis of screw 24. Since rod 15 is coupled at one end to operating screw 24 and at the other end to adapter nut 10, the latter is rotated upon rotation of the operating screw 24.

An important feature of the invention is the novel construction of the indicator mechanism which results in greatly improved operation and reliability. This particular feature comprises a hollow operating screw 24 having diametrically opposed slots 26 elongated to a distance at least equal to the full travel of the indicator rod 36, the total length of which may be varied to suit a wide range of valve sizes. Moreover, the slots 26 straddle the crossbar 27 as the latter extends into the annular recess 38 so that the crossbar 27 moves either upward or downward coincident with the position of the combined follower nut 30 and retaining cap 39. The indicator rod 36 is provided with a hole 37 slightly larger than the diameter of the crossbar 27 so that the latter may rotate freely therein as the operating screw 24 is rotated. The crossbar 27 thus transmits translational motion to the indicator rod 36 as it travels from the inner- or lowermost retractable position which is level with the outermost surface 48, to the upper- or outermost projected visible position beyond the surface 48.

In construction and combination, we have provided an indicator post possessing overall improved advantages, one which is less vulnerable to damage resulting from the totally enclosed protective housing and having a visual target easily observed from a substantial distance. All of which contribute towards an indicator post capable of rendering improved operation and reliability in service.

We claim:

1. A device for indicating the extent of opening or closing of valves operable by means of a rotatable valve stem characterized by an elongated housing, an elongated rotatable member within said housing, said member being restrained against longitudinal movement, a second member within said housing restrained against rotary movement by being in operable engagement with said elongated rotatable member in a manner to produce straight line motion in said second member upon rotation of said elongated rotatable member, an indicator rod engaged with said second member and extending to the outside of said housing, means externally of said housing for rotating said rotatable member and means for coupling said rotatable member to the valve stem.

2. A device in accordance with claim 1 in which said elongated rotatable member has a central passageway through which said indicator rod extends, said rotatable member has at least one elongated slot extending through the wall thereof, a connecting member extends from said second member through said slot into said passageway, and said indicator rod is attached to said second member in a manner which permits the connecting member to rotate with said rotatable member.

3. A device in accordance with claim 2 in which said elongated rotatable member is outwardly threaded and said second member is threadedly engaged with said rotatable member.

4. A device in accordance with claim 1 in which said indicator rod extends outside said housing from the end opposite to that in which said coupling means is located.

5. A device in accordance with claim 2 in which said indicator rod extends outside said housing from the end opposite to that in which said coupling means is located.

6. A device in accordance with claim 3 in which said indicator rod extends outside said housing from the end opposite to that in which said coupling means is located.

7. A device in accordance with claim 1 in which means are provided at the end of the housing opposite to that from which the indicator rod extends for mounting said housing on a valve, and said coupling means is located adjacent the same end as said mounting means.

8. A device in accordance with claim 2 in which means are provided at the end of the housing opposite to that from which the indicator rod extends for mounting said housing on a valve, and said coupling means is located adjacent the same end as said mounting means.

9. A device in accordance with claim 3 in which means are provided at the end of the housing opposite to that from which the indicator rod extends for mounting said housing on a valve, and said coupling means is located adjacent the same end as said mounting means.

10. A device in accordance with claim 3 in which said elongated rotatable member has two oppositely positioned slots, the said second member is a follower nut threaded onto said elongated rotatable member, said connecting member is a crossbar extending transversely through said slots and through a hole in said indicator rod, the ends of the crossbar are attached to said follower nut in a manner to permit said ends to revolve and rotate relative to said nut and said follower nut and inside wall of said housing have cooperating keys and elongated keyways to prevent the nut from rotating.

11. A device in accordance with claim 2 in which said elongated slots are of sufficient length to enable the connecting member of crossbar to travel the full distance along the line of motion to which it is translated during full opening and complete closing of the valve in connection with which it is adapted to be used.

12. A device in accordance with claim 3 in which said elongated slots are of sufficient length to enable the connecting member or crossbar to travel the full distance along the line of motion to which it is translated during full opening and complete closing of the valve in connection with which it is adapted to be used.

13. A device in accordance with claim 6 in which said elongated slots are of sufficient length to enable the connecting member or crossbar to travel the full distance along the line of motion to which it is translated during full opening and complete closing of the valve in connection with which it is adapted to be used.

14. A device in accordance with claim 10 in which the crossbar is round and the crossbar fits loosely in the hole in the indicator rod.

UNITED STATES PATENT OFFICE
CERTIFICATE OF CORRECTION

Patent No. 3,554,160    Dated January 12, 1971

Inventor(s) Ronald Fortune, Ernest G. Mills, James Beverley Wood

It is certified that error appears in the above-identified patent and that said Letters Patent are hereby corrected as shown below:

Column 2, line 70, change "from" to --form--.

Claim 11, line 3, change "of" to --or--.

Signed and sealed this 29th day of June 1971.

(SEAL)
Attest:

EDWARD M. FLETCHER, JR.
Attesting Officer

WILLIAM E. SCHUYLER, J
Commissioner of Patent